Patented Jan. 5, 1926.

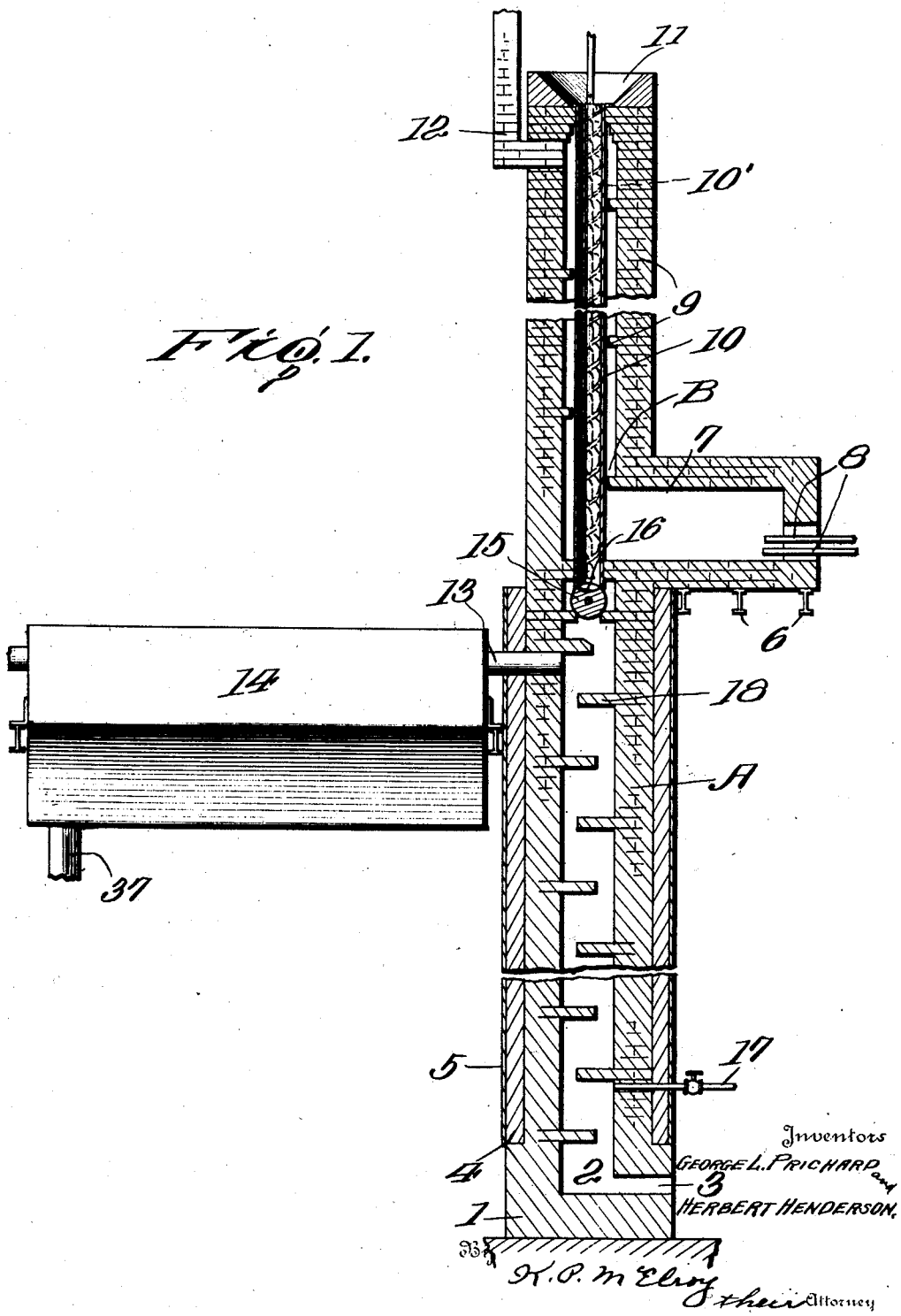

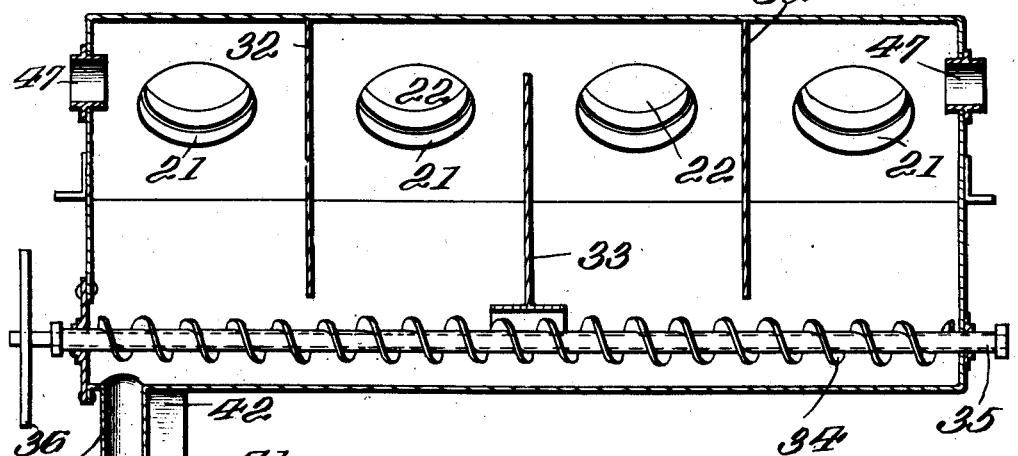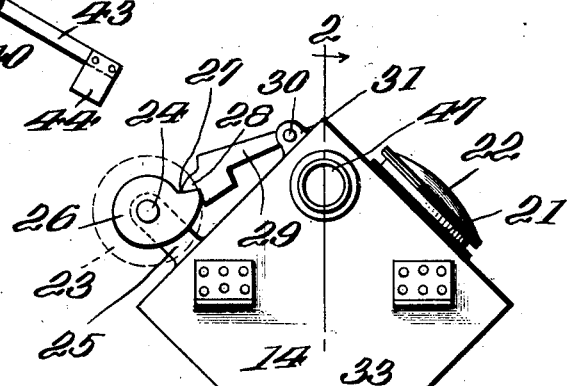

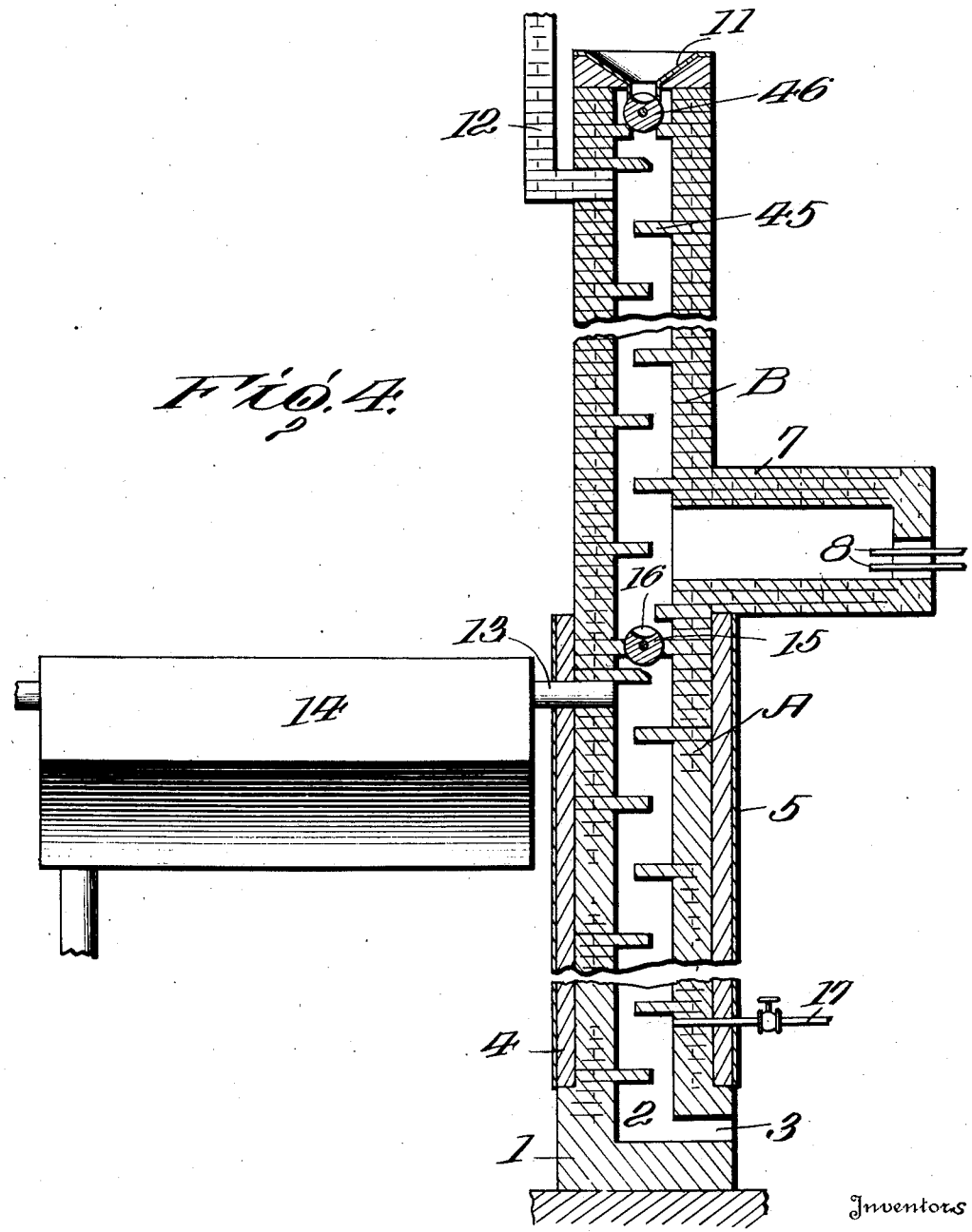

1,568,181

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

PROCESS OF MAKING CHLORIDES.

Application filed November 17, 1921. Serial No. 515,852.

*To all whom it may concern:*

Be it known that we, GEORGE L. PRICHARD and HERBERT HENDERSON, citizens of the United States, and residents of Port Arthur, in the county of Jefferson and State of Texas, have invented certain new and useful Improvements in Processes of Making Chlorides, of which the following is a specification.

This invention relates to processes of making chlorides; and it comprises a method of making volatile metallic chlorides wherein solid reaction material together with admixed carbon, is preheated to a high temperature and dropped into a vertical reaction chamber passing therethrough in retarded fall and in an upwardly flowing current of chlorin, etc., the vapors of volatile chlorides formed being removed near the top of said chamber and solid reaction residues near the bottom; all as more fully hereinafter set forth and as claimed.

It is the purpose of the present invention to provide an economical method of producing volatile chlorides, such as aluminum chloride. To this end, the solid reaction materials, in this instance bauxite and coke, are first heated in a preliminary heating chamber and then dropped into a reaction chamber containing chlorin through which they pass with a retarded fall, retardation being caused by lateral shelf-like projections in the chamber. Into the bottom of the chamber is supplied a feed of chlorin while from its top vapors of aluminum chloride are directed to a suitable condenser. In so doing, time for complete chlorination is afforded the charge and the residue reaching the bottom of the chamber is mostly coke ash and silica from the material. By its character the rate of feed is determined. Utilization of the chlorin is also good. Neither the temperature nor the amount of heat required for the conversion is very great and both are easy to supply by preheating the solids of the charge in the way described, thereby obviating any necessity for supplying heat through the walls of the reaction chamber itself. Additional heat may however be supplied in the chamber, if desired, by the expedient of using more or less commercial aluminum dross in connection with the bauxite. Aluminum dross is composed of skimmings and other wastes in the aluminum industry and as it comes on the market after removal of as much metallic aluminum as is practicable, it generally still contains between 10 and 20 per cent of metal, the residue being mostly alumina. As the reaction of the metal with either chlorin or hydrochloric acid is highly exothermic, a small admixture of dross with the charge will furnish all the heat that may be necessary.

In the accompanying drawings we have shown two forms of apparatus in which our process may be performed.

Figure 1 is a vertical section through the heating chamber and reaction chamber, with the condenser or subliming chamber shown in elevation;

Figure 2 is a vertical section through the subliming chamber along line 2—2 of Figure 3;

Figure 3 is an end elevation of the subliming chamber and

Figure 4 is a vertical section through another form of heating element, also showing the subliming chamber in elevation.

Referring to the drawings in which similar reference numerals designate corresponding parts, 1 indicates a rectangular or other shaped reaction chamber which may be of fire brick or the like and is provided at the bottom with ash pit 2 and an opening 3 for removal of solid reaction residues. The reaction chamber is insulated by means of heat insulating material, such as asbestos, kieselguhr ("silocel"), bauxite or the like 4 enclosed in the steel or iron shell 5.

As the reaction chamber is operating at the expense of the heat stored in materials delivered to it heat insulation is advantageous. The reaction chamber is lettered A as a whole. Mounted upon the beams or other foundation 6 is stove or fire box 7 having oil and steam or other suitable burner indicated by pipe 8. Above and communicating with this fire box is a vertical shaft 9 which together with the interior steel shell 10 constitutes the furnace or heating chamber B. The steel tube 10 is provided with a hopper 11 for feed of materials thereinto and the shaft 9 is provided with a stack 12 for carrying away waste gases.

The lower or reaction chamber A is provided with the offtake 13 leading to a subliming or condensing chamber 14 shown in detail in Figures 2 and 3.

At a point advantageously below the fire box 7 is located the valve feeding device 15 which may be a grooved cylinder or the like having the groove 16 for receiving material. This is rotated and carries material from tube 10 into the reaction chamber A down which it drops with a retarded fall and is acted upon by chlorin, hydrochloric acid or other chlorin containing gas admitted through valved inlet 7. Feed screw 10' may be used to assist the feed of material down the tube 10. This feeding device 15 also serves as a seal to prevent escape of the vapors evolved in the reaction chamber A, such vapors going through the conduit 13 to the condenser 14.

The reaction chamber A is provided with a series of plates, transversely arranged, tiles or the like 18 forming shelves down which the material coming from tube 10 tumbles. As shown, they have horizontal upper faces but in use, material residues accumulate thereon to form angle-of-repose piles, giving sloping upper faces over which new material progresses with a retarded fall. Such material having been preheated in the tube 10 comes into contact in its heated condition with the reaction gas admitted through 17 and the vapors evolved go to the subliming chamber, as described.

The condensing chamber (see Figures 2 and 3) comprises a rectangular or other shaped box-like or tank-like receptacle 14, provided with manholes 21 normally closed by the covers 22 and having on one or more sides a knocking or pounding device, arranged to tap such sides and jar them to an extent sufficient to loosen adhering condensed solid matter. Each of these knocking devices as shown comprises a wheel 23 keyed to a shaft 24 journaled in brackets 25, this wheel carrying an eccentric or lifting cam 26 shouldered at 27 and adapted to engage lip 28 of hammer 29 which is pivoted at 30 to ear 31 on the side of the condensing chamber.

This knocking or shaking device may be used continuously or at intervals, as the exigencies of any particular situation demand.

The condensing chamber 14 is shown as provided inside with a series of depending baffle plates 32 and upright baffle plates 33, the different sets being advantageously staggered so that the vapors going from end to end follow a tortuous path. Toward the lower side the chamber is provided with a conveyor, here shown as a screw conveyor 34 set on the shaft 35 provided with a pulley or wheel 36 driven from a motor, not shown. This screw conveyor serves to carry the condensed material from one end to the other and to chute 37, normally closed by door 38 pivoted at 39 to the arm 40 which in turn is pivoted at 41 to the bracket 42 and carrying the extension arm 43 with a weight 44 at one end. The weight serves to keep the door 38 in closed position. With the rectangular box-like chamber set edgewise, as shown, the lower portion directs falling material to the conveyer.

In Figure 4 is shown a somewhat modified form of apparatus useful in our process and within our invention. In Figure 1 previously described, the gases or products of combustion from the burner pass around the steel shell 10 and do not come into direct contact with the material to be heated. In Figure 4 provision is made for permitting direct contact of the furnace gases with the material. The lower portion of reaction chamber A of this device is similar to the reaction chamber in the figure described; the upper chamber B, of Figure 4, however, contains a series of staggered shelves 45 over which the material tumbles. The gases from the burner 8 come in direct contact therewith and pass out through the stack 12.

The feeding device of valve 46 under the hopper 11 in Figure 4 is advantageous because there should be a seal against the exit of gases at this point. In the construction of Figure 1 this device is not needed at this point since the tube itself is in direct communication with the hopper and is sealed at the bottom by means of the feeding device 15. That is to say, in Figure 4 because the gases come in direct contact with the material fed down the shaft B, the two feeding and sealing devices are useful.

The operation of the apparatus described is obvious from the foregoing.

In employing the described apparatus in the performance of our process we start the burner 8 and fill the tube 10 (Figure 1) with pulverized material to be heated.

This material may be a mixture of bauxite and carbon, such as coke; or the mixture may also contain aluminum dross. For reasons previously stated, the dross is a useful addition. Dross and carbon alone may be used and particularly if the dross is poor in metal; but ordinarily it is better to use bauxite also in order to utilize the exothermic action of the dross. Other exothermically acting aluminous material, such as aluminum carbid, sulfid, nitrid, etc., may be used instead of or with the dross. In various processes of treating oils with aluminum chloride, a coky residue is produced from which the chloride is recovered by distilling it away. The carbon so produced usually still contains some alumina and may be used in the present process; as may the coky residue itself. The mixture of aluminous material and carbon is fed down the tube 10 and heated usually to a temperature around 1000° F. (depending upon the character of the material used) and feeding device 15 is operated to continuously feed this material into the reaction chamber A. In this chamber it is contacted with chlorin which may or may not be preheated or with other gas containing chlorin, such as hydrochloric acid gas which also may or may not be preheated with the resultant formation of aluminum chloride vapors which find exit through the pipe 13 to the condensing chamber 14. In this chamber which is exposed to the air or which may be otherwise cooled, this material settles to the bottom and on the sides, from which it is shaken and it is then conducted by means of the screw conveyor 34 to the chute 37 and to a place of disposition not shown. Any gases not condensible in this subliming chamber find exit therefrom through flues 47. When free chlorin to any substantial extent escapes through 47, the chlorin feed is diminished or the feed of reaction material is increased. The knocking or shaking device may be used continuously or at intervals to loosen adhering aluminum chloride from the walls and baffle plates.

In operation of the apparatus shown in Figure 4, the material in preheating chamber or furnace B comes into direct contact with the products of combustion from the burner.

As stated, the present process is particularly useful when aluminum dross is employed because relatively low heating temperatures may be used in preheating.

Residues of unused carbon, coke ash, silica and silicates from the bauxite, etc. accumulate in 2, sealing outlet 3 against escape of gases and vapors. Residue is withdrawn at 3 occasionally. The character of this residue affords a useful control upon the operation. If it contains much bauxite, the use of more carbon is indicated and vice versa. If both reach the bottom in substantial quantities either the feed of chlorin or that of solids must be adjusted.

What we claim is:—

1. In the manufacture of volatile chlorides from metallic oxids, carbon and chlorin, the process which comprises preheating a mixture of oxid and carbon to a reacting temperature, and tumbling the mixture vertically through an atmosphere of chlorin containing gas, solid residues being withdrawn at the bottom of the reaction chamber and vapors of chlorides at the top.

2. The process of making aluminum chloride which comprises heating a mixture of carbon and material containing alumina to a temperature sufficiently high to furnish substantially the amount of heat necessary for formation of aluminum chloride vapors upon contact with chlorin, passing a stream of such a heated mixture into and through a reaction chamber, partially obstructing the fall of the mixture during its passage through the reaction chamber, and in the reaction chamber contacting it with chlorin to form aluminum chloride and vaporize the same, said chlorin flowing in countercurrent to said mixture and withdrawing and condensing the vapors.

3. In the manufacture of aluminum chloride, the process which comprises preheating a mixture of carbon and an aluminous material containing material which, when contacted with chlorin to form aluminum chloride will act exothermically, and exposing such preheated mixture as a tumbling moving stream in vertical retarded fall to a countercurrent of chlorin.

4. In the manufacture of aluminum chloride, the process which comprises preheating a mixture of aluminous material and carbon, tumbling said mixture down a reaction zone and passing chlorin in contact with said mixture in an opposite direction to produce vapors of aluminum chloride, conducting said vapors away from the reaction zone and condensing them.

5. The process of making aluminum chloride which comprises heating a carbon-alumina mixture as a traveling stream, delivering such mixture to a chlorinating apparatus, and there chlorinating it while the mixture travels therethrough in a substantially zigzag path.

6. The process of making aluminum chloride which comprises heating a carbon-alumina mixture as a traveling stream, delivering such mixture to a chlorinating apparatus, tumbling such mixture through said chlorinating apparatus in a continuous stream, and chlorinating the mixture during its passage through the chlorinating apparatus.

In testimony whereof we have hereunto signed our names at Port Arthur, Texas, this 14th day of November, 1921.

GEORGE L. PRICHARD.
HERBERT HENDERSON.